US007097699B2

(12) United States Patent
Egli et al.

(10) Patent No.: US 7,097,699 B2
(45) Date of Patent: Aug. 29, 2006

(54) COMPOSITION FOR PRINTING RECORDING MATERIALS

(75) Inventors: Robert Egli, Therwil (CH); Oliver Eich, Basel (CH); Hans-Tobias Macholdt, Darmstadt-Eberstadt (DE); Reinhard Pedrazzi, Allschwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 33 days.

(21) Appl. No.: 10/499,167

(22) PCT Filed: Dec. 18, 2002

(86) PCT No.: PCT/IB02/05509

§ 371 (c)(1),
(2), (4) Date: Jun. 14, 2004

(87) PCT Pub. No.: WO03/052008

PCT Pub. Date: Jun. 26, 2003

(65) Prior Publication Data

US 2005/0061200 A1   Mar. 24, 2005

(30) Foreign Application Priority Data

Dec. 19, 2001  (GB)  .............................. 0130316.3

(51) Int. Cl.
*C09D 11/02* (2006.01)
(52) U.S. Cl. .............................. 106/31.43; 106/31.48; 106/31.51
(58) Field of Classification Search ............ 106/31.43, 106/31.48, 31.51; 428/195.1; 347/100
See application file for complete search history.

(56) References Cited

U.S. PATENT DOCUMENTS

| 4,308,542 | A |   | 12/1981 | Maekawa et al. |
|-----------|---|---|---------|----------------|
| 4,554,181 | A |   | 11/1985 | Cousin et al. |
| 4,626,284 | A |   | 12/1986 | Ohta et al. |
| 4,703,113 | A |   | 10/1987 | Baxter et al. |
| 4,935,307 | A |   | 6/1990 | Iqbal et al. |
| 4,956,230 | A |   | 9/1990 | Edwards et al. |
| 4,963,189 | A |   | 10/1990 | Hindagolla |
| 5,041,411 | A | * | 8/1991 | Chapman et al. ............ 503/227 |
| 5,062,892 | A |   | 11/1991 | Halko |
| 5,134,198 | A |   | 7/1992 | Stofko, Jr. et al. |
| 5,219,928 | A |   | 6/1993 | Stofko, Jr. et al. |
| 5,382,561 | A | * | 1/1995 | Mori et al. .................. 503/227 |
| 5,416,227 | A | * | 5/1995 | Tanner et al. ................ 524/159 |
| 5,756,212 | A |   | 5/1998 | Liebler et al. |
| 5,853,540 | A |   | 12/1998 | Niemoller et al. |
| 6,036,307 | A | * | 3/2000 | Hakamada et al. .......... 347/106 |
| 6,096,418 | A |   | 8/2000 | Sato et al. |
| 6,099,625 | A | * | 8/2000 | Bradbury et al. .......... 106/31.27 |
| 6,117,224 | A | * | 9/2000 | Siegel et al. .............. 106/31.43 |
| 6,302,948 | B1 | * | 10/2001 | Lin et al. .................. 106/31.37 |
| 6,406,526 | B1 | * | 6/2002 | Meyrick et al. .......... 106/31.48 |
| 6,723,835 | B1 | * | 4/2004 | Millard et al. .............. 534/772 |
| 6,780,901 | B1 |   | 8/2004 | Endo et al. |
| 6,866,706 | B1 | * | 3/2005 | Ishida et al. ............. 106/31.47 |
| 2004/0050288 | A1 | * | 3/2004 | Geary et al. ............. 106/31.01 |
| 2004/0231558 | A1 | * | 11/2004 | Kohgo et al. ............ 106/31.48 |
| 2005/0022695 | A1 | * | 2/2005 | Yokoyama et al. ...... 106/31.28 |

FOREIGN PATENT DOCUMENTS

| DE | 30 18 342 A1 | 11/1980 |
| DE | 44 46 551 C1 | 3/1996 |
| EP | 0 164 196 A1 | 12/1985 |
| EP | 0 425 150 A2 | 5/1991 |
| EP | 0 805 230 A2 | 5/1997 |
| EP | 0805230 | * 11/1997 |
| EP | 0 875 393 A1 | 11/1998 |
| EP | 1 088 861 A1 | 4/2001 |
| EP | 1088861 | * 4/2001 |
| WO | WO 95/28284 A1 | 10/1995 |
| WO | WO 02/062905 A2 | 8/2002 |

OTHER PUBLICATIONS

Derwent abstract of CN 1289803, Apr. 2001.*
Derwent abstract of CN 1133320, Oct. 1996.*
Chemical Abstracts, vol. 97, No. 16, Oct. 18, 1982 Columbus, Ohio, US; abstract No. 129102s, p. 82; col. 1; XIN PAN et al.: "A study of water-soluble disperse dyes containing the carboxymethylsulfonyl group", Huagong Xuebao, vol. 1, 1982, pp. 26-34, XP002238479, no month available.
Chemical Abstracts, vol. 125, No. 6, Aug. 5, 1996 Columbus, Ohio, US; abstract No. 60940r, p. 146; col. 1; Chun-Xiang Kuang et al.: "Study of decarboxylation kinetics of azo-dyes containing carboxymrthylsulfonyl group by thermgravimetry", Huaxue Yanjiu Yu YingYong, vol. 7, No. 1, 1995, pp. 68-71, XP002238483, no month available.
English Abstract for CN 1133320, Oct. 1996.
R.W. Kenyon, "Chemistry and Technology of Printing and Imaging Systems", Peter Gregory, Blackie Academic & Professional, Chapmann & Hall 1996, pp. 113-138, no month available.
Chemical Abstracts, vol. 128, Columbus, Ohio, US; abstract No. 218358, Kuang et al.: "Synthesis and decarboxylation of anthraquinone dyes and intermediates containing carboxmethylsulfonyl group", Yingyong Huaxue, 1998, XP002257394, no month available.

(Continued)

Primary Examiner—Helene Klemanski
(74) Attorney, Agent, or Firm—Tod A. Waldrop

(57) ABSTRACT

A composition for printing recording materials comprising a) at least one temporarily water-soluble dye with one $SO_2CH_2COOM$ group being present in the molecule; b) water or a medium including a mixture of water and an organic solvent, an anhydrous organic solvent or a solid having a low melting point, and c) optionally further additives.

9 Claims, No Drawings

OTHER PUBLICATIONS

Wang Honglin et al., "Cyanation of water-soluble disperse dyes", Elsevier; Dyes and Pigments, vol. 41, No. 1-2, Feb. 1, 1999, pp. 35-39.
English Abstract for CN 1289803, Apr. 2001.

PCT Search Report for application No. PCT/IB 02/05509, mail dated Oct. 28, 2003.
PCT International Preliminary Examination Report for application No. PCT/IB 02/05509, mail dated Apr. 20, 20004.

* cited by examiner

COMPOSITION FOR PRINTING RECORDING MATERIALS

The invention relates to a composition for printing recording materials, especially textile fibre materials, plastic films and plastic transparencies by conventional printing or by the inkjet printing process and to the use of the compositions for printing the abovementioned recording materials by means of the inkjet printing process and also to the recording materials printed thereby.

Inkjet printing processes are becoming more and more important for industrial applications. This process is used for instance in the textile industry to replace printing screen processes. Appreciable cost and time savings are possible as a result, since it is no longer necessary to fabricate the individual screens.

Inkjet printing processes are known. In what follows, the principle of inkjet printing will only be discussed very briefly. Details of this technology are described for example in the Ink-Jet-Printing section of R. W. Kenyon in "Chemistry and Technology of Printing and Imaging Systems", Peter Gregory (editor), Blackie Academic & Professional, Chapmann & Hall 1996, pages 113–138, and references cited therein.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

In hot melt inkjet printer solid hot melt inks are loaded in a printer capable of melting the ink in the inkjet printer head, ejecting the liquid ink which quickly resolidifies upon impacting a substrate. Conventional hot melt inkjet printers operate with a printing head and inkjet temperature of about 120 to about 150° C. At those temperatures, the solid ink is melted to a low viscosity liquid, generally about 8 to 25 cP when measured at jetting temperature.

By additionally disposing at least one nozzle with yellow, magenta or cyan ink side by side it is possible to obtain colour reproductions in high quality. This process is known as polychromatic printing or, when three colour components are used, as trichromatic printing.

Conventional printing processes are well known and differ in the way the printing ink or printing paste is transfered to the substrate: For example, inks or pastes can be applied by raised type (e.g. letter press, flexographic), from a planar surface (lithographic), from a recessed surface (intaglio) or through a stencil (silk screen). Different methods of application and different substrates require different properties in the ink.

The composition of the ink for the inkjet printing process has to possess a suitable conductivity, sterility in storage, viscosity and surface tension to meet the specific requirements of inkjet ink. In addition, the prints on the recording materials have to have good properties and fastness.

Useful recording materials, as mentioned above, are textile fibre materials, plastic films and plastic transparencies. But preferably paper and papery substrates, glass and metal may be used as well.

Useful papers or papery substrates include all known such materials (see e.g. P. A. McManus et al, "Paper Requirements for Color Imaging with Ink Jets", TAPPI, Vol. 66, No. 7, July, 1983, pp. 81–5.). Preference is given to papers or papery substrates coated on at least one side with a material which is particularly receptive to ink compositions. Such papers or papery materials are described inter alia in DE 3018342, DE 4446551, EP 164196 and EP 875393. Useful papers also include papers made up mainly of synthetic pulp and wood pulp as well as paper made up of synthetic pulp alone. If desired, synthetic fibers, inorganic fibers, vegetable fibers except for wood pulp, etc. can be added. The paper may comprise thermoplastic polymers, for example, homo- or co-polymers of vinyl monomers such as ethylene, propylene, acrylonitrile, styrene, acrylic ester, vinyl acetate, vinyl chloride and vinylidene chloride, polyamides and polyesters.

Useful materials for printing are hydrophobic fibers and fabrics. Those fibers are made of such as acetate-, triacetate-, polyester-, polyamide-, polyacrylnitrile-, polyvinylchloride- or polyurethane-polymers and blends thereof. The fabrics may be made of wool or silk, or may comprise wool or silk together with other synthetic or natural fibers. The fabrics and sheetlike textile material may also be a blended fabric.

On the other hand, useful textile fibre materials are in particular hydroxyl-containing fibre materials as well. If hydroxyl-containing fibre materials are used preference is given to cellulosic fibre materials, which consist of or comprise cellulose. Examples are natural fibre materials such as cotton, linen or hemp and regenerated fibre materials such as, for example, viscose and also lyocell. Particular preference is given to viscose or preferably cotton.

The fibre materials mentioned are preferably present as sheetlike textile wovens, non-wovens, formed-loop knits or webs.

Useful plastic films or plastic transparencies include all known such materials. Preference is given to plastic films or plastic transparencies coated on at least one side with a material which is particularly receptive to the ink compositions. Such plastic films or plastic transparencies are described inter alia in EP 755332, U.S. Pat. No. 4,935,307, U.S. Pat. No. 4,956,230, U.S. Pat. No. 5,134,198 and U.S. Pat. No. 5,219,928. Suitable polymers are polyvinyl alcohol (PVA), polyvinylpyrrolidone (PVP), cellulose derivatives, (meth)acrylic acid derivatives, polyvinyl acetate or copolymers thereof and mixtures of such substances. This invention provides a composition for printing recording materials, preferably paper and papery substrates, textile fibre materials, plastic films and plastic transparencies by non-impact printing process, particularly by the ink jet, bubble jet or jet printing process.

The ink compositions of the present invention comprise temporarily water-soluble dyes comprising a carboxymethyl sulfonyl group (—SMC; which is a —SO$_2$CH$_2$COOM group; and M being a non-chromophoric cation or H).

The composition for printing recording materials according to the invention comprises:

a) at least one dye of the formula (I), (II), (III) and/or (IV)

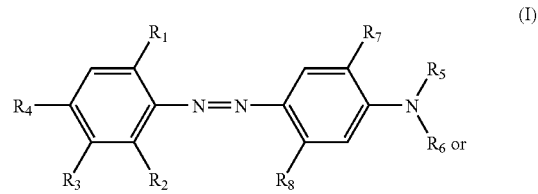

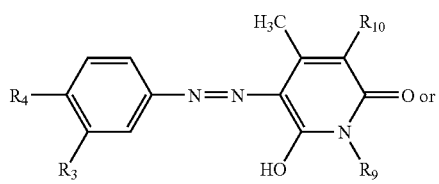

(II)

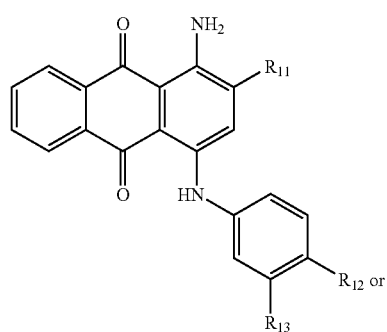

(III)

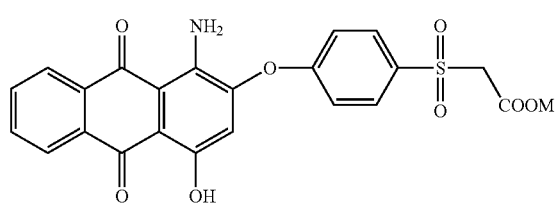

(IV)

wherein
R$_1$ signifies H; Cl; Br; or —CN;
R$_2$ signifies H; Cl; Br; or —CN;
R$_3$ signifies H; —CH$_3$; —OCH$_3$; or —SO$_2$CH$_2$COOM;
R$_4$ signifies H; —CH$_3$; —OCH$_3$; —NO$_2$; or —SO$_2$CH$_2$COOM;
R$_5$ signifies —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH=CH$_2$; or —CH$_2$C$_6$H$_5$;
R$_6$ signifies —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH=CH$_2$; or CH$_2$C$_6$H$_5$;
R$_7$ signifies H; —OCH$_3$; or —OCH$_2$CH$_3$;
R$_8$ signifies H; —CH$_3$; —OCH$_3$; —NHCOCH$_3$; —NHCOC$_6$H$_5$; or —NHSO$_2$CH$_2$COOM;
R$_9$ signifies —CH$_3$; or —CH$_2$CH$_3$;
R$_{10}$ signifies H, or —CN;
R$_{11}$ signifies H; or —SO$_3$M;
R$_{12}$ signifies —OCH$_3$; —OCH$_2$CH$_3$; —OCH$_2$CH$_2$OCH$_3$; —SO$_2$CH$_2$COOM; —OCH$_2$CH$_2$SO$_2$CH$_2$COOM; or —SCH$_2$CH$_2$SO$_2$CH$_2$COOM;
R$_{13}$ signifies H; —SO$_2$CH$_2$COOM; or CH$_2$SO$_2$CH$_2$COOM;
with M being a non-chromophoric cation or H;
and the proviso that only one SO$_2$CH$_2$COOH-group is present in the molecule;

or mixtures of compounds of the formula (I), (II), (III) and/or (IV), b) water or a medium including a mixture of water and an organic solvent, an anhydrous organic solvent or a solid having a low melting point, and c) optionally further additives.

This invention further relates to the use of a composition comprising at least one of the dyes according to formula (I), (II), (III) and/or (IV) as set forth above with M being a non-chromophoric cation or H; and the with proviso that only one SO$_2$CH$_2$COOH-group is present in the molecule; or mixtures of compounds of the formula (I), (II), (III) and/or (IV), in a conventional printing process or in an inkjet printing process for printing recording materials.

This invention further relates to the use according comprising at least one of the dyes according to formula (I), (II), (III) and/or (IV) in a trichromatic printing process is used.

This invention further relates to the use according comprising at least one of the dyes according to formula (I), (II), (III) and/or (IV) wherein the recording materials are paper and papery substrates, textile fibre materials and plastic films and plastic transparencies.

Printed paper and papery substrates, textile fibre materials and plastic films and plastic transparencies printed with a composition as defined in claim 1 or 4.

Depending upon the reaction and/or isolation conditions, the dyestuffs according to the formula (I), (II), (III) and/or (IV) may be obtained as the free-acid, salt or mixed salt form, containing, for example, one or more non-chromophoric cations selected from the alkali metal cations, e.g., the sodium ion, or an ammonium ion or an alkylammonium cation, e.g., mono-, di-, or tri-methyl or ethylammonium cations. The dyestuffs may be converted from the free-acid form to a salt or mixed salt form or vice-versa or from one salt form to another according to conventional techniques.

The dyes and their preparation used for the inventive composition of the printing ink are mostly known from Chinese patent application CN1289803A, Chinese Patent CN1050374C, "Yingyong Huaxue (1998), 15(1), 25–28", Huagong Xuebao (1982), (1), 26–34", "Huaxue Yanjiu Yu Yingyong (1995), 7(1), 68–71" or "Dyes and Pigments, 41 (1999) 35–39".

The dyes of the formula (I), (II), (III) and/or (IV) used in the inks should preferably be low in salt, i.e. have a total salt content of less than 0.5% by weight, based on the weight of the dyes. Dyes having higher salt contents (owing to their preparation and/or the subsequent addition of extenders) may be desalted, for example by means of membrane separation processes, such as ultrafiltration, reverse osmosis or dialysis.

Preferably the dyes in the inks and printing pastes are exclusively temporarily water-soluble dyes comprising one carboxymethyl sulfonyl group.

Preferred dyes for the composition of the present invention are the compounds of formula (I), (II), (III) and (IV) listed below in Table 1, Table 2 and Table 3:

TABLE 1

(wherein -SMC signifies a carboxymethyl sulfonyl group, wherein is a —SO$_2$CH$_2$COOM group; and M being a non-chromophoric cation or H;)

$$\text{(I)}$$

| entry | R1 | R2 | R3 | R4 | R5 | R6 | R7 | R8 |
|---|---|---|---|---|---|---|---|---|
| 1 | H | H | -SMC | H | C$_2$H$_5$ | C$_2$H$_4$CN | H | H |
| 2 | H | H | H | -SMC | C$_2$H$_5$ | C$_2$H$_5$ | H | NHCOCH$_3$ |
| 3 | H | H | H | -SMC | C$_2$H$_5$ | C$_2$H$_4$CN | H | H |
| 4 | H | H | H | -SMC | C$_2$H$_5$ | C$_2$H$_5$ | H | CH$_3$ |
| 5 | H | H | H | -SMC | C$_2$H$_5$ | CH$_2$C$_6$H$_5$ | H | H |
| 6 | Br | H | H | -SMC | C$_2$H$_5$ | CH$_2$C$_6$H$_5$ | H | H |
| 7 | H | H | H | -SMC | C$_2$H$_5$ | C$_2$H$_5$ | OCH$_3$ | H |
| 8 | Br | H | H | -SMC | C$_2$H$_5$ | C$_2$H$_5$ | H | NHCOCH$_3$ |
| 9 | Br | H | H | -SMC | C$_2$H$_5$ | C$_2$H$_5$ | OCH$_3$ | NHCOCH$_3$ |
| 10 | Br | H | H | -SMC | Allyl | Allyl | OCH$_3$ | NHCOCH$_3$ |
| 11 | Br | H | H | -SMC | C$_2$H$_5$ | C$_2$H$_5$ | H | NHCOC$_6$H$_5$ |
| 12 | H | H | H | -SMC | C$_2$H$_5$ | C$_2$H$_5$ | OCH$_3$ | NHCOC$_6$H$_5$ |
| 13 | Br | H | H | -SMC | C$_2$H$_5$ | C$_2$H$_5$ | OCH$_3$ | NHCOC$_6$H$_5$ |
| 14 | Br | Br | H | -SMC | C$_2$H$_5$ | C$_2$H$_5$ | H | NHCOCH$_3$ |
| 15 | Br | Br | H | -SMC | C$_2$H$_5$ | C$_2$H$_5$ | H | NHCOC$_6$H$_5$ |
| 16 | Br | Br | H | -SMC | Allyl | Allyl | OCH$_3$ | NHCOCH$_3$ |
| 17 | Br | Br | H | -SMC | C$_2$H$_5$ | C$_2$H$_5$ | OCH$_3$ | NHCOCH$_3$ |
| 18 | Br | Br | H | CH$_3$ | C$_2$H$_5$ | C$_2$H$_5$ | H | NH-SMC |
| 19 | Br | Br | H | NO$_2$ | C$_2$H$_5$ | C$_2$H$_5$ | H | NH-SMC |
| 20 | H | H | H | -SMC | C$_2$H$_4$OCOCH$_3$ | C$_2$H$_4$OCOCH$_3$ | H | NHCOCH$_3$ |
| 21 | H | H | H | -SMC | C$_2$H$_4$OCH$_3$ | C$_2$H$_4$OCH$_3$ | H | NHCOCH$_3$ |
| 22 | H | H | -SMC | OCH$_3$ | C$_2$H$_4$OCOCH$_3$ | C$_2$H$_4$OCOCH$_3$ | H | H |
| 23 | H | H | -SMC | OCH$_3$ | C$_2$H$_5$ | C$_2$H$_5$ | H | NHCOCH$_3$ |
| 24 | H | H | H | -SMC | C$_2$H$_5$ | C$_2$H$_5$ | H | H |
| 25 | H | H | H | -SMC | C$_2$H$_4$OCOCH$_3$ | C$_2$H$_4$OCOCH$_3$ | OCH$_3$ | NHCOCH$_3$ |
| 26 | CN | H | H | -SMC | C$_2$H$_5$ | C$_2$H$_5$ | H | NHCOCH$_3$ |
| 27 | CN | H | H | -SMC | C$_2$H$_5$ | C$_2$H$_5$ | H | NHCOC$_6$H$_5$ |
| 28 | CN | H | H | -SMC | Allyl | Allyl | OCH$_3$ | NHCOCH$_3$ |
| 29 | CN | H | H | -SMC | C$_2$H$_5$ | C$_2$H$_5$ | OCH$_3$ | NHCOCH$_3$ |
| 30 | CN | Br | H | -SMC | C$_2$H$_5$ | C$_2$H$_5$ | H | NHCOCH$_3$ |
| 31 | CN | CN | H | -SMC | C$_2$H$_5$ | C$_2$H$_5$ | H | NHCOCH$_3$ |
| 32 | CN | Br | H | -SMC | C$_2$H$_5$ | C$_2$H$_5$ | OCH$_3$ | NHCOCH$_3$ |
| 33 | CN | CN | H | -SMC | C$_2$H$_5$ | C$_2$H$_5$ | OCH$_3$ | NHCOCH$_3$ |
| 34 | CN | Br | H | -SMC | Allyl | Allyl | OCH$_3$ | NHCOCH$_3$ |
| 35 | CN | CN | H | -SMC | Allyl | Allyl | OCH$_3$ | NHCOCH$_3$ |
| 36 | CN | CN | H | -SMC | C$_2$H$_5$ | C$_2$H$_5$ | H | H |
| 37 | CN | CN | H | CH$_3$ | C$_2$H$_5$ | C$_2$H$_5$ | H | NH-SMC |
| 38 | CN | CN | H | NO$_2$ | C$_2$H$_5$ | C$_2$H$_5$ | H | NH-SMC |

TABLE 2

(wherein -SMC signifies a carboxymethyl sulfonyl group, wherein is a —SO$_2$CH$_2$COOM group; and M being a non-chromophoric cation or H;)

$$\text{(II)}$$

| entry | R3 | R4 | R9 | R10 |
|---|---|---|---|---|
| 39 | H | -SMC | CH$_3$ | CN |
| 40 | H | -SMC | C$_2$H$_5$ | CN |
| 41 | -SMC | OCH$_3$ | C$_2$H$_5$ | H |
| 42 | -SMC | H | C$_2$H$_5$ | H |
| 44 | -SMC | H | C$_2$H$_5$ | CN |

TABLE 3

(wherein -SMC signifies a carboxymethyl sulfonyl group, which is a —SO₂CH₂COOM group; and M being a non-chromophoric cation or H;)

(III)

[Structure III: anthraquinone with NH₂, R₁₁, HN-phenyl with R₁₂, R₁₃]

| entry | R₁₁ | R₁₂ | R₁₃ |
|---|---|---|---|
| 45 | H | OCH₃ | -SMC |
| 46 | —SO₃H | OCH₃ | -SMC |
| 47 | H | OCH₃ | CH₂-SMC |
| 48 | H | OCH₂CH₃ | CH₂-SMC |
| 49 | H | OCH₂CH₂OCH₃ | CH₂-SMC |
| 50 | H | -SMC | H |
| 51 | —SO₃H | -SMC | H |
| 52 | H | OCH₂CH₂-SMC | H |
| 53 | —SO₃H | OCH₂CH₂-SMC | H |
| 54 | H | SCH₂CH₂-SMC | H |
| 55 | —SO₃H | SCH₂CH₂-SMC | H |

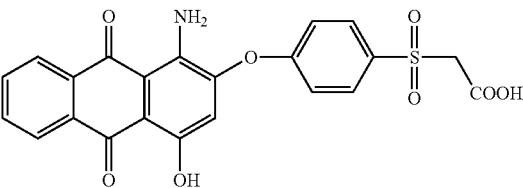

(IV)

The inks or pastes preferably include a total amount of dyes of the above formulae (I). (II), (III) and/or (IV) which is in the range from 1 to 35% by weight, especially in the range from 2 to 35% by weight, preferably in the range from 2 to 30% by weight, more preferably in the range from 2.5 to 20% by weight, based on the total weight of the ink or paste.

The inks include 99–65% by weight, especially 98–65% by weight, preferably 98–70% by weight, more preferably 97.5–80% by weight, of an abovementioned medium b), which includes water or a mixture of water and an organic solvent, an anhydrous organic solvent or a solid having a low melting point.

When said medium b) is a mixture including water and an organic solvent or an anhydrous organic solvent, then the dye of the formula (I), (II), (III) and/or (IV) or mixtures thereof are preferably completely dissolved in this medium.

Preferably the dye of the formula (I), (II), (III) and/or (IV) or mixtures thereof have a solubility of not less than 2.5% by weight in this medium b) at 20° C.

When the ink composition of the invention is used for printing paper or papery substrates or hydrophobic substrates made of acetate-, polyester-, polyamide-, polyacrylnitrile-, polyvinylchloride- or polyurethane-polymers and blends thereof, the inks are preferably used together with the following compositions.

When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20.

It is preferable for the organic solvent which is included in the mixture with water to be a water-soluble solvent or a mixture of various water-soluble solvents. Preferred water-soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and keto alcohols, preferably acetone, methyl ethyl ketone, cyclohexanone and 4-Hydroxy-4-methyl-2-pentanone; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol, thiodiglycol and oligo- and poly-alkylene glycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)ethoxy]ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per b) includes water and at least 2 or more, more preferably 2 to 8, water-soluble organic solvents.

Particularly preferred water-soluble solvents are cyclic amides, particularly 2-pyrrolidone, N-methylpyrrolidone and N-ethylpyrrolidone; diols, preferably 1,5-pentanediol, ethylene glycol, thiodiglycol, diethylene glycol and triethylene glycol; and mono-$C_{1-4}$-alkyl and di-$C_{1-4}$-alkyl ethers of diols, more preferably mono-$C_{1-4}$-alkyl ethers of diols possessing 2 to 12 carbon atoms, particularly preferably 2-[2-(2-methoxyethoxy)ethoxy]ethanol.

A preferred medium as per b) includes:
(i) 75 to 95 parts by weight of water and
(ii) 25 to 5 parts of one or more of the following solvents: diethylene glycol, 2-pyrrolidone, thiodiglycol, N-methylpyrrolidone, cyclohexanol, caprolactone, caprolactam and 1,5-pentanediol,
wherein the parts are by weight and all parts of (i) and (ii) add up to 100.

Examples of further useful ink compositions including water and one or more organic solvents are found in the Patent Specifications U.S. Pat. No. 4,963,189, U.S. Pat. No. 4,703,113, U.S. Pat. No. 4,626,284 and EP 425150A.

When the medium as per b) includes an anhydrous (i.e. less than 1% by weight of water) organic solvent, this solvent will have a boiling point of 30 to 200° C., more preferably of 40–150° C., particularly preferably of 50–125° C.

The organic solvent can be water-insoluble, water-soluble or mixtures of such solvents. Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$; and ethers, preferably diethyl ether; and mixtures thereof.

When the liquid medium as per b) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per b) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 140° C. Useful low-melting solids include long-chain fatty acids or alcohols, preferably those having a $C_{18-24}$-carbon chain, and sulphonamides. Conventional low-melting ink vehicles generally include various proportions of waxes, resins, plasticizers, tackifiers, viscosity modifiers and antioxidants.

The ink composition and the printing pastes of the invention may further include as auxiliaries additional components which are normally used in inkjet inks or printing pastes, for example buffers, viscosity improvers, surface tension improvers, fixation accelerants, biozides, corrosion inhibitors, levelling agents, drying agents, humefactants, ink penetration additives, light stabilisers, UV absorbers, optical brighteners, coagulation reducers, ionic or nonionic surfactants and conducting salts. These auxiliaries are preferably added in an amount of 0–5% by weight to inks. To printing pastes up to 70% by weight, especially up to 60% by weight, preferably up to 55% by weight, based on the total weight of the printing paste.

To prevent precipitations in the ink compositions of the invention, the dyes used have to be purified clean. This can be done with commonly known purifying methods.

When the compositions of the invention are used for printing textile fibre materials, preference is given to using the following compositions.

When printing textile fibre materials, useful additives, besides the solvents including water, are synthetic, natural thickener or modified natural thikeners which may include water-soluble nonionic cellulose ethers, alginates or bean gum ether. All, the water-soluble nonionic cellulose ethers, the alginates and the bean gum ether, are used as thickeners to adjust the ink to a certain viscosity.

Useful water-soluble nonionic cellulose ethers include for example methyl-, ethyl-, hydroxyethyl-, methylhydroxyethyl-, hydroxypropyl- or hydroxypropylmethyl-cellulose. Preference is given to methylcellulose or in particular hydroxyethylcellulose. Cellulose ethers are customarily used in the ink in an amount of 0.01 to 2% by weight, especially 0.01 to 1% by weight, preferably 0.01 to 0.5% by weight, based on the total weight of the ink.

Useful alginates include in particular alkali metal alginates, preferably sodium alginate. These are customarily used in the ink in an amount of 0.01 to 2% by weight, especially 0.01 to 1% by weight, preferably 0.01 to 0.5% by weight, based on the total weight of the ink.

Printing pastes include up to 70% by weight thickening agents, preferably up to 55% by weight thickening agents. In printing pastes the thickening agents are used in an amount of 3 to 70% by weight, especially 5 to 60% by weight, preferably 7 to 55% by weight, based on the total weight of the printing paste.

In the ink jet printing process preference is given to ink compositions having a viscosity of 1 to 40 mPa·s, especially 5 to 40 mPa·s, preferably 10 to 40 mPa·s. Ink compositions having a viscosity of 10 to 35 mPa.s are particularly preferred.

Preference is given to ink compositions having a surface tension of 15–73 mN/m, especially 20–65 mN/m, particularly preferably 30–50 mN/m.

Preference is given to ink compositions having a conductivity of 0.1–100 mS/cm, especially 0.5–70 mS/cm, particularly preferably 1.0–60 mS/cm.

The inks may further include buffer substances, for example acetate, phospate, borax, borate or citrate. Examples are sodium acetate, di-sodium hydrogen phosphate, sodium borate, sodium tetraborate and sodium citrate.

They are used in particular in amounts of 0.1 to 3% by weight, preferably 0.1 to 1% by weight, based on the total weight of the ink, to set a pH of for example 4 to 10, especially 6 to 8. A citrate buffer is preferred in the case of alginatic inks. Acatate buffers and/or phosphate buffers are preferred in the preparation of printing pastes.

As further additives the inks may include for example N-methyl-2-pyrrolidone or especially 1,2-propylene glycol. These are customarily used in the ink in an amount of 5 to 30% by weight, especially 5 to 20% by weight, preferably 10 to 20% by weight, based on the total weight of the ink.

The inks may further include customary additives, for example foam suppressants or especially fungal and/or bacterial growth inhibitors. These are customarily used in amounts of 0.01 to 1% by weight, based on the total weight of the ink.

The aqueous neutral inks (pH 4–10; preferably with a pH from 6 to 8) are prepared by adding a small amount of a base if the dyes are not readily soluble. Useful bases are any non coloured bases. Especially suitable are diluted ammonia ($NH_3$), diluted caustic soda (NaOH), soda ($Na_2CO_3$), disodium hydrogen phosphate ($Na_2HPO_4$), sodium acetate (NaOAc), triethylamine ($N(C_2H_5)_3$) or triethanolamine ($N(C_2H_4OH)_3$). Disodium hydrogen phosphate ($Na_2HPO_4$) is a preferred base.

After printing, the fibre material is advantageously dried, preferably at temperatures up to 150° C., especially 80 to 120° C., during 1 to 3 minutes and subsequently subjected to a heat treatment process to complete the print or to complete the fixation of the dye. During the fixing process dry heat is applied up to 250° C., especially in a range from 180 to 220° C. during 15 seconds to 4 minutes in order to fix the dye. If steam is used temperatures chosen are up to 200° C. especially in a range from 130° C. to 180° C. during 3 to 15 minutes.

The heat treatment can be carried out for example by means of a hot batch process, a thermosoling process or a steaming process. In the steaming process, the printed fibre material is subjected for example to a treatment in a steamer with superheated or nonsuperheated steam, advantageously at a temperature of 130° C. to 180° C. Thereafter the printed fibre material is generally washed off with water in a conventional manner to remove unfixed dye. This includes reductive cleaning using a hydrosulfite solution (e.g. of the disodium salt) or an alkaline solution. It is also possible to wash with water of 15 to 40° C. comprising tensides, compounds with a dye affinity.

The present invention further provides aqueous printing inks for the inkjet printing process, which are characterized in that they include a) 5 to 35% by weight of at least one dye of the above formula (I), (II), (III) and/or (IV) and b) 0.01 to 2% by weight of a water-soluble nonionic cellulose ether or of an alginate.

The printing inks, printing pastes and also the dyes of the formulae (I), (II), (III) and/or (IV) are subject to the above-indicated meanings and preferences.

The prints obtainable by the process of the invention have good general fastnesses, a good lightfastness, good wetfastnesses, such as fastness to washing, water, sea water, and perspiration, a good chlorine fastness, rub fastness, fastness to hot pressing and pleating and also sharp contours and a high colour strength. The printing inks used are notable for good stability and good viscosity properties. The viscosity remains virtually unchanged even in the event of high shearing forces occurring during printing.

A further aspect of the present invention is the use of the printing ink in trichromatic printing. Trichromatic printing is a very large application for all recording materials. This form of printing is normally carried out with a yellow, red and blue ink (generally cyan, yellow and magenta) composition. It is also possible to print with cyan, yellow, magenta and black ink compositions.

This invention further provides recording materials which have been printed with a composition according to the invention.

The composition of the invention can also be used with all known and suitable conventional printing machines and conventional printing methods.

The composition of the invention can also be used with all known and suitable inkjet printers for printing textile fibre materials, plastic films and plastic transparencies. This applies not only to the use in monochromatic printing but also to polychromatic printing, especially trichromatic printing.

This invention further provides the use of the compositions according to this invention in a conventional printing process for printing recording materials.

This invention further provides the use of the compositions according to this invention in an inkjet printing process for printing recording materials.

This invention further provides the use of the compositions according to this invention in a polychromatic printing process for printing recording materials.

This invention further provides the use of the compositions according to this invention in a trichromatic printing process is used.

This invention further provides the use of the compositions according to this invention for printing paper and papery substrates, textile fibre materials and plastic films and plastic transparencies.

This invention further provides printed paper and papery substrates, textile fibre materials and plastic films and plastic transparencies printed with the compositions according to this invention.

The following examples illustrate the invention. Temperatures are in degrees Celsius; parts and percentages are by weight, unless otherwise stated.

EXAMPLE OF INK COMPOSITIONS

The composition is preferably prepared by heating the medium to 40° C. and then adding a dye of the formula (I), (II), (III) and/or (IV) or a mixture thereof. Small amounts of disodium hydrogen phosphate solution is added until the dyes are dissolved.

The composition is then cooled down to room temperature and the further ingredients are added.

The fractions of the individual components of the ink compositions

| | |
|---|---|
| 1–35 parts | of a dye of the formula (I), (II), (III) and/or (IV) and/or its salt or mixtures of various dyes of the formula (I), (II), (III) and/or (IV), |
| 65–99 parts | of water or a medium including a mixture of water and an organic solvent, an anhydrous organic solvent or a solid having a low melting point and optionally |
| 0–5 parts | of one or more additives. |

The total sum of all the parts of a composition according to the invention is 100 parts.

A preferred ink composition of the invention consists of

| | |
|---|---|
| 2–6 parts | of a dye of the formula (I), (II), (III) and/or (IV) and/or its salt or mixtures of various dyes of the formula (I), (II), (III) and/or (IV), |
| 15–30 parts | of glycerol and |
| 64–83 parts | of water. |

The sum of all ingredients is 100 parts. This ink composition is used for printing papers, papery substrates, textile fibre materials and plastic films and plastic transparencies.

A further preferred ink composition according to the invention consists of

| | |
|---|---|
| 2–6 parts | of a dye of the formula (I), (II), (III) and/or (IV) and/or its salt or mixtures of various dyes of the formula (I), (II), (III) and/or (IV) and |
| 94–98 parts | of a medium consisting of 90 parts of water and 10 parts of 2-pyrrolidone. |

The sum of all ingredients is 100 parts. This ink composition is used for printing papers, papery substrates, textile fibre materials and plastic films and plastic transparencies.

A Ink Jet Printing Ink According to the Invention:

| | |
|---|---|
| Ink 1 | |
| 6 parts | of dye 2 from table 1 (orange), |
| 20 parts | of glycerol and |
| 74 parts | of water. |
| Ink 2 | |
| 2 parts | of dye 4 from table 1 (yellow-brown) and |
| 98 parts | of a medium consisting of 90 parts of water and 10 parts of 2-pyrrolidone. |

The ink 1 and the ink 2 were used used for printing polyester fabrics by the ink jet method. After the fabrics were printed, the fabrics were dried at 100° C., during 3 minutes and subsequently subjected to a heat treatment process to complete the print or to complete the fixation of the dye respectively. During the fixing process steam was used at temperatures at 170° C. during 12 minutes. Thereafter the printed fibre material was washed off with water in a conventional manner to remove unfixed dye including reductive cleaning using a sodium hydrosulfite solution. After rinsing with water a orange print was obtained for the fabric printed with the Ink 1 and a yellow-brown print was obtained for the fabric printed with the Ink 2.

A Printing Paste According to the Invention:

| | |
|---|---|
| 500 g | of a thickener (bean gum ether e.g. Indalca ™), |
| 10 g | of a fixation accelerant (e.g. Printogen HDN ™), |
| 10 g | of a levelling agent (e.g. Sandogen CN ™), |
| 10 g | of a buffer and dispersant system for dyeing (eg. Sandacid PB ™; 1:2) and |
| 10 g | of dye 2 from table 1 (orange dye)) |
| ca. 10 ml | 25% NH₃ solution in water and adding water up to 1000 g. |

(Indalca was purchased from Cesalpinia S.p.A, Italy; Sandogen, Printogen and Sandacid are a trademarks of Clariant International Ltd, Muttenz/Switzerland.)

This printing paste is used for printing papers, papery substrates, textile fibre materials and plastic films and plastic transparencies.

Printing with the Printing Paste:

A polyester fabric was conventionally printed with the printing past. After printing, the fibre material was dried, preferably at a temperature of about 105° C., during 3 minutes and subsequently subjected to a heat treatment process to complete the print or to complete the fixation of the dye respectively. During the fixing process dry heat was applied at 200° C. for 4 minutes in order to fix the dye. Thereafter the printed fibre material was washed off with water in a conventional manner to remove unfixed dye including reductive cleaning using a sodium hydrosulfite. After rinsing with water a orange print was obtained.

The invention claimed is:

1. An ink jet printing composition for ink jet printing a recording material comprising
    a) at least one dye of the formula (I), (II), (III) or (IV)

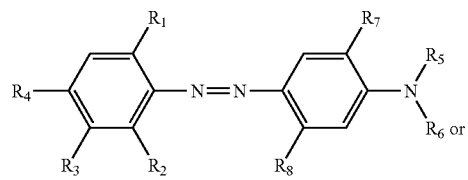

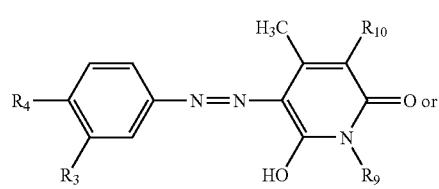

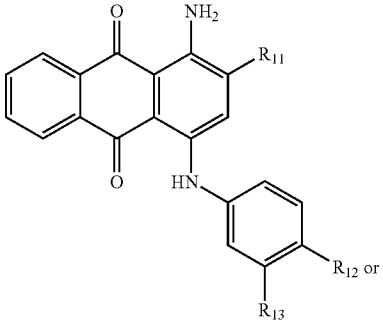

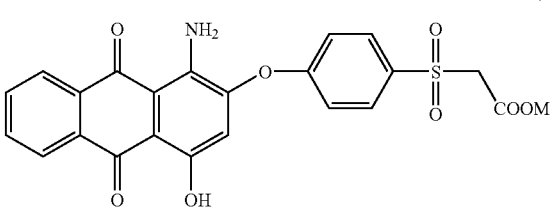

wherein
 $R_1$ is H; Cl; Br; or —CN;
 $R_2$ is H; Cl; Br; or —CN;
 $R_3$ is H; —CH$_3$; —OCH$_3$; or —SO$_2$CH$_2$COOM;
 $R_4$ is H; —CH$_3$; —OCH$_3$; —NO$_2$; or —SO$_2$CH$_2$COOM;
 $R_5$ is —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH═CH$_2$; or —CH$_2$C$_6$H$_5$;
 $R_6$ is —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH═CH$_2$; or CH$_2$C$_6$H$_5$;
 $R_7$ is H; —OCH$_3$; or —OCH$_2$CH$_3$;
 $R_8$ is H; —CH$_3$; —OCH$_3$; —NHCOCH$_3$; —NHCOC$_6$H$_5$; or —NHSO$_2$CH$_2$COOM;
 $R_9$ is —CH$_3$; or —CH$_2$CH$_3$;
 $R_{10}$ is H, or —CN;
 $R_{11}$ is H; or —SO$_3$M;
 $R_{12}$ is —OCH$_3$; —OCH$_2$CH$_3$; —OCH$_2$CH$_2$OCH$_3$; —SO$_2$CH$_2$COOM; —OCH$_2$CH$_2$SO$_2$CH$_2$COOM; or —SCH$_2$CH$_2$SO$_2$CH$_2$COOM;
 $R_{13}$ is H; —SO$_2$CH$_2$COOM; or CH$_2$SO$_2$CH$_2$COOM;
 with M being a non-chromophoric cation or H;
 and with the proviso that only one SO$_2$CH$_2$COOH-group is present in the molecule; and
    b) water or a medium including a mixture of water and an organic solvent, an anhydrous organic solvent or a solid having a low melting point.

2. An ink jet printing composition for an inkjet printing process for printing a recording material comprising at least one of the dyes according to formula (I), (II), (III) or (IV)

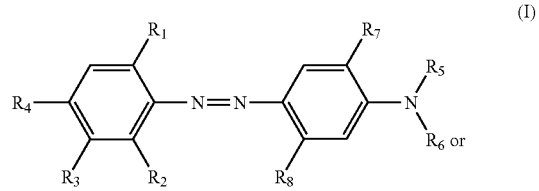

-continued

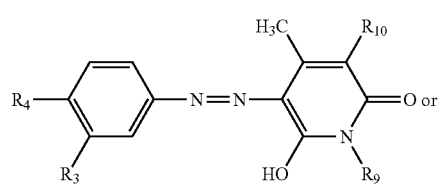
(II)

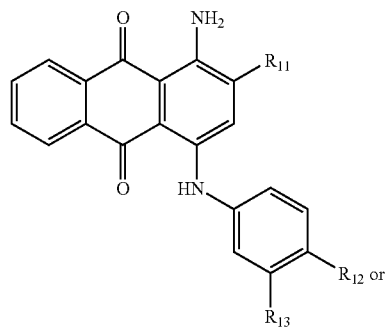
(III)

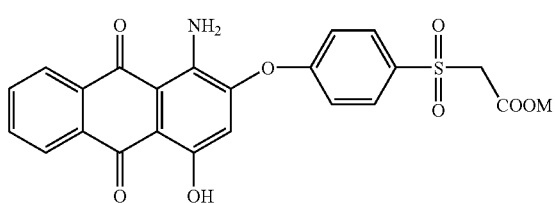
(IV)

wherein
R$_1$ is H; Cl; Br; or —CN;
R$_2$ is H; Cl; Br; or —CN;
R$_3$ is H; —CH$_3$; —OCH$_3$; or —SO$_2$CH$_2$COOM;
R$_4$ is H; —CH$_3$; —OCH$_3$; —NO$_2$; or —SO$_2$CH$_2$COOM;
R$_5$ is —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH=CH$_2$; or —CH$_2$C$_6$H$_5$;
R$_6$ is —CH$_2$CH$_3$; —CH$_2$CH$_2$OCH$_3$; —CH$_2$CH$_2$CN; —CH$_2$CH$_2$OH; —CH$_2$CH$_2$OCOCH$_3$; —CH$_2$CH$_2$COOCH$_3$; —CH$_2$CH=CH$_2$; or CH$_2$C$_6$H$_5$;
R$_7$ is H; —OCH$_3$; or —OCH$_2$CH$_3$;
R$_8$ is H; —CH$_3$; —OCH$_3$; —NHCOCH$_3$; —NHCOC$_6$H$_5$; or —NHSO$_2$CH$_2$COOM;
R$_9$ is —CH$_3$; or —CH$_2$CH$_3$;
R$_{10}$ is H, or —CN;
R$_{11}$ is H; or —SO$_3$M;
R$_{12}$ is —OCH$_3$; —OCH$_2$CH$_3$; —OCH$_2$CH$_2$OCH$_3$; —SO$_2$CH$_2$COOM; —OCH$_2$CH$_2$SO$_2$CH$_2$COOM; or —SCH$_2$CH$_2$SO$_2$CH$_2$COOM;
R$_{13}$ is H; —SO$_2$CH$_2$COOM; or CH$_2$SO$_2$CH$_2$COOM;
with M being a non-chromophoric cation or H;
and with the proviso that only one SO$_2$CH$_2$COOH-group is present in the molecule.

3. The inkjet printing composition according to claim 2, wherein the inkjet printing process is a trichromatic printing process.

4. The ink wet printing composition according to claim 2 wherein the recording material is selected from the group consisting of paper, papery substrates, textile fibre materials, plastic films and plastic transparencies.

5. A recording material ink jet printed with an ink jet printing composition as defined in claim 1.

6. The recording material of claim 5, wherein the recording material is selected from the group consisting of printed paper, papery substrates, textile fibre materials, plastic films and plastic transparencies.

7. A recording material ink jet printed with an ink jet printing composition as defined in claim 2.

8. The recording material according to claim 7, wherein the recording material is selected from the group consisting of printed paper, papery substrates, textile fibre materials, plastic films and plastic transparencies.

9. The ink jet printing composition according to claim 1, further comprising at least one additive.

* * * * *